Jan. 8, 1963 J. F. KREPS 3,072,759
FLAT TIRE INDICATOR
Filed Nov. 4, 1960 2 Sheets-Sheet 1
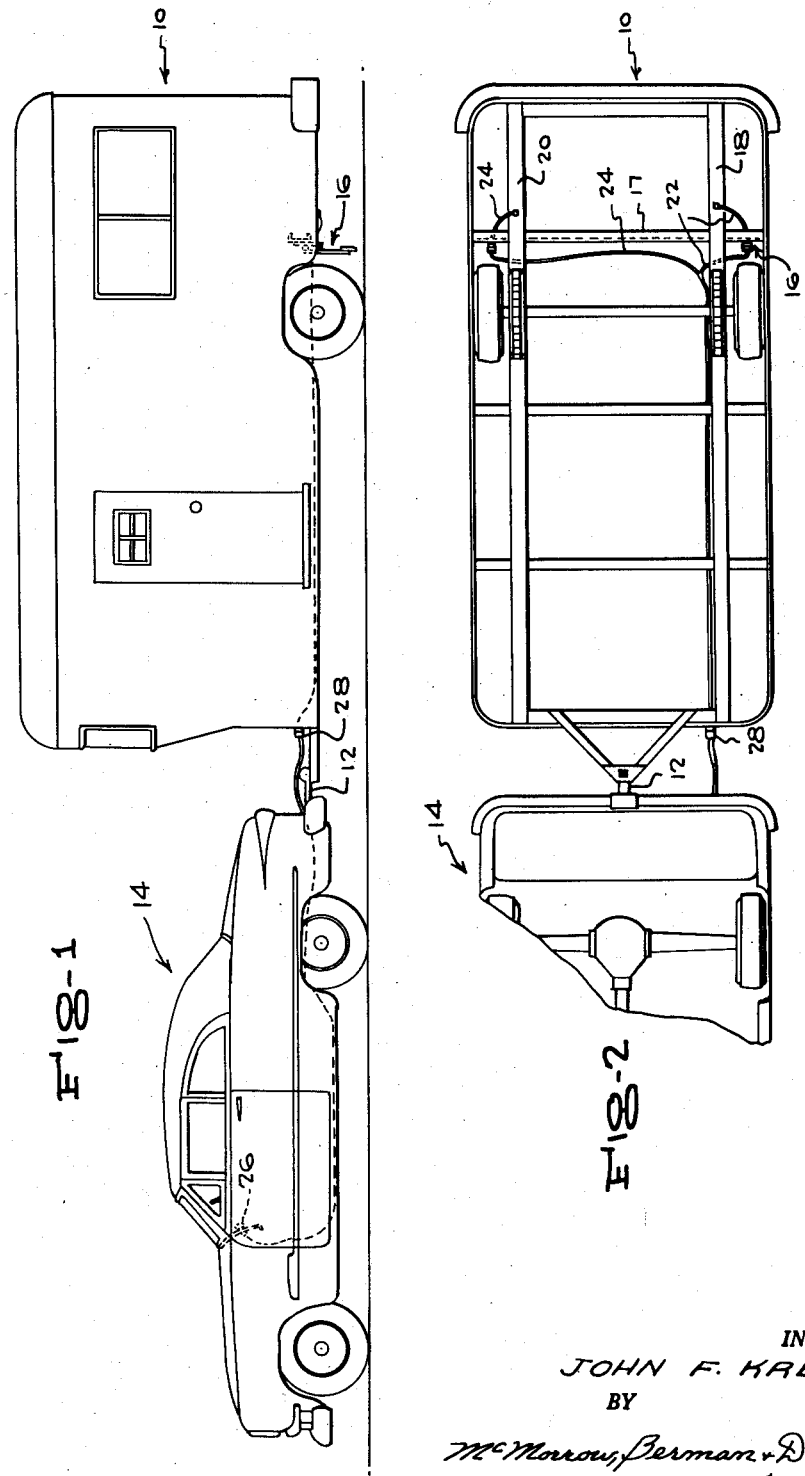
INVENTOR.
JOHN F. KREPS
BY
McMorrow, Berman & Davidson
ATTORNEYS

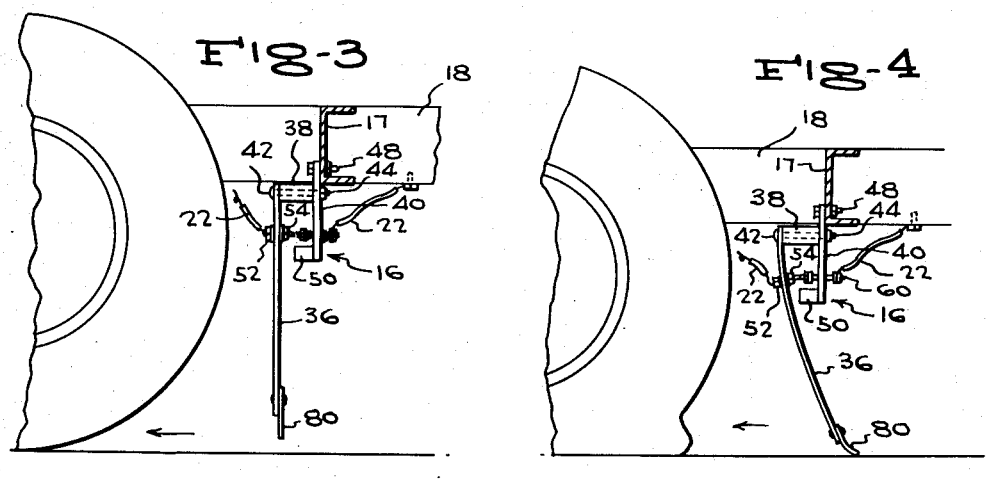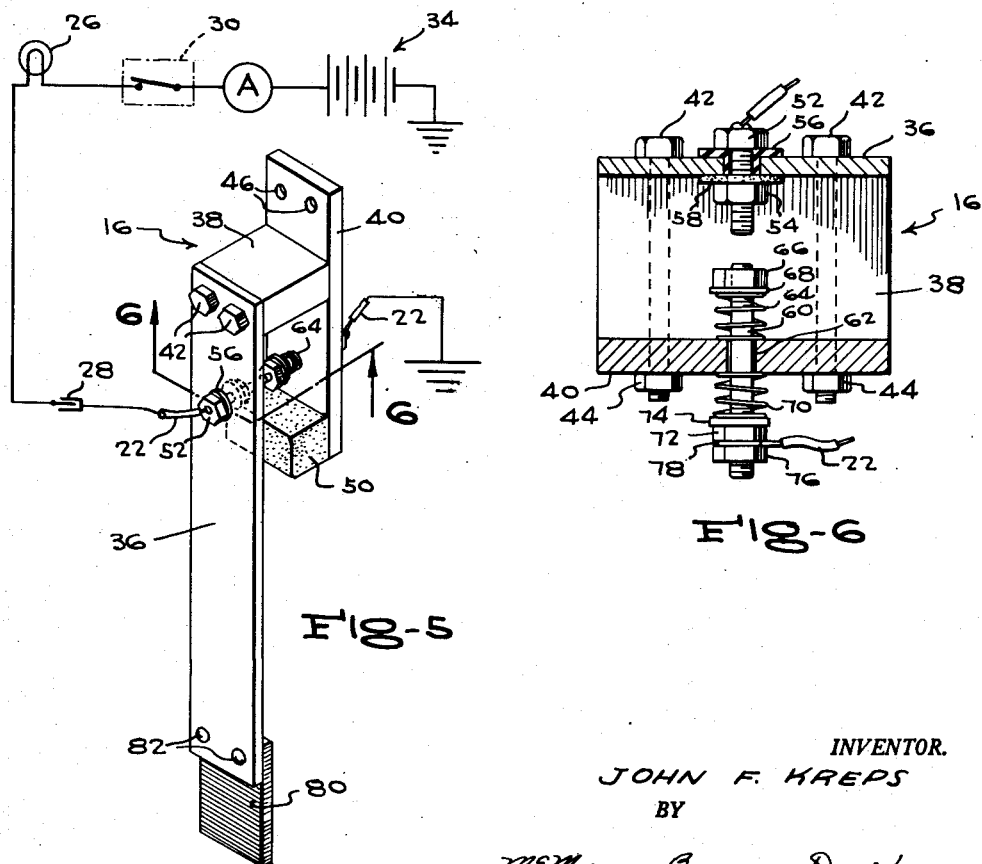

United States Patent Office 3,072,759
Patented Jan. 8, 1963

3,072,759
FLAT TIRE INDICATOR
John F. Kreps, Box 57, Sloat, Calif.
Filed Nov. 4, 1960, Ser. No. 67,345
3 Claims. (Cl. 200—61.24)

This invention relates to alarm signals in general, and in particular to a warning device which communicates a signal in response to undue loss of pressure in the pneumatic tire of a vehicle. As such, it finds particular utility in trailer vehicles, where the occurrence of flat tires is not usually manifest to the driver in the towing vehicle. Not only is this situation ruinous to tires, rims and wheels, but is also a hazard to life, limb, and other property.

It is therefore an object of the invention to provide a signal device which operates in response to subnormal pressures in tires.

More particularly, it is an object to operate such a signal in response to lowering of a vehicle due to tire flattening.

Other objects include providing such a device which is simple in structure, low in cost, and easy of manufacture, installation and maintenance, coupled with reliability of performance.

Briefly described, the present device comprises a contact switch in the ground line from a signal light, the switch having a fixed contact, and a movable contact carried on a flexible bar depending from the underside of the vehicle frame and adapted to flex following contact of its lower end with the ground.

For a more detailed description of the invention, reference is made to the following specification, as illustrated in the drawings, in which:

FIGURE 1 is a side elevational view of a house trailer coupled to a motor car, showing the signal device under the trailer, and the electrical line running to a signal light on the dash of the car, FIGURE 2 is a bottom plan view of the parts in FIGURE 1, with part of the towing car omitted, FIGURE 3 is a fragmentary view of a portion of the trailer of FIGURE 1 in the vicinity of the warning switch, showing the parts substantially enlarged over the scale of FIGURE 1, FIGURE 4 is a view similar to FIGURE 3, showing the tire deflated and the warning switch actuated to close the circuit, FIGURE 5 is a still further enlarged view, in perspective, of the warning switch, per se, together with a diagram of the signal circuit, and FIGURE 6 is a sectional view taken on the plane of the line 6—6 of FIGURE 5.

Referring to the drawings by characters of reference, there is shown, generally, in FIGURE 1, a house trailer 10 coupled to the hitch 12 of a towing vehicle 14, in this case a passenger car. The alarm switches, indicated as a whole by the numeral 16, are secured to a transverse channel member 17 extending between the longitudinal frame members 18, 20 on the underside of the trailer, whereby the vigilance is extended to both wheels of the trailer. The switches are included in a pair of lines 22, 24 which lead from a signal light 26 on the dash of vehicle 14 through a connector 28, and are grounded on frame members 18, 20. The same reference characters appear in FIGURE 5, wherein 30 is the ignition switch, 32 is an ammeter, and 34 is the car battery.

Referring to FIGURES 3 to 6, the actual sensing element is a readily flexible, elongate steel bar 36 vertically depending from a supporting platform 38 horizontally extending from a vertical plate 40, the three parts being connected by a pair of bolts 42 secured by nuts 44. Plate 40 extends above and below platform 38, and has a pair of bores 46 near its upper end through which it is secured by bolts 48 to frame channel 17, and carries at its lower end a limit stop or buffer 50 of fibrous or resilient material to cushion against damage to the contacts of the switch if an obstacle of excessive size should be encountered by the sensing arm during travel.

Plates 36 and 40 carry the respective contacts of the switch, one of which is fixed to the flexible bar 36, and the other of which is slidably mounted in plate 40. The fixed contact comprises a bolt 52 secured in a bore in bar 36 by a nut 54, and insulated therefrom by a grommet 56 and washer 58. The movable contact comprises a threaded shank 60, received in a bore 62 in plate 40, and resiliently held against sliding, in both directions, by a compression coil spring 64 inwardly of plate 40 held by a nut 66 and washer 68, and a second compression spring 70 outwardly of plate 40, and held by a nut 72 and washer 74. A second nut 76 secures the lead 78 of the part of line 22 leading to the trailer frame.

In order to avoid damage to the switch and to the highway surface, the flexing bar 36 is provided at its lower end with a terminal piece 80 of fibrous or resilient, organic material, preferably belting stock, which is conveniently secured, as in a lap joint, by rivets 82.

As seen in FIGURE 3, the trailer is moving forwardly, in the direction indicated by the arrow. If a tire happens to deflate for any reason while thus moving, the vehicle is lowered in consequence, the extension 80 contacts the ground and the bar 36 is bent, bringing the inner end of bolt 52 into contact with the inner end of slidable shank 60, closing the circuit to the signal light. The spring mounting of shank 60 ensures maintenance of contact through a suitable range of flexure of the sensing bar 36. Since it is desirable to have the lower end of the sensing arm reasonably near the ground when the tire is fully inflated, it is possible that the signal will be manifest intermittently when traveling over uneven terrain. Therefore, the signal need not be heeded unless continuously energized.

In lieu of placing the signal in the towing vehicle, it may be located on the forward part of the trailer in a position visible to the driver through the rear view mirror, in which case much wiring, as well as the connector 28, may be dispensed with.

While a certain preferred embodiment has been shown and described, the same is capable of modification, and the invention should not therefore be deemed as limited except as shall appear from the spirit and scope of the appended claims.

I claim:
1. A switch for use in a tire-deflation signaling circuit comprising a supporting plate adapted for attachment to the frame of a vehicle, a shelf extending perpendicularly from the face of said plate, an elongate, flexible bar secured at one end to the outer edge of said shelf, in general parallelism with said plate and extending beyond the end of said plate, a ground-wiping pad of organic material secured to and extending beyond the outer end of said bar, a first contact slidably mounted in a bore in said plate, spring means on opposite sides of said plate engaging said contact to oppose sliding movement in either direction, a second contact fixedly secured in said bar, electrically insulated therefrom and arranged to engage said first contact on flexure of said bar, and a resilient buffer stop on said plate below said first contact positioned for contact by said bar upon flexure of said bar.

2. A switch for use in a tire-deflation signaling circuit comprising a supporting plate adapted for attachment to the frame of a vehicle, a shelf extending perpendicularly from the face of said plate, an elongate, flexible bar secured at one end to the outer edge of said shelf, in general parallelism with said plate and extending beyond the end of said plate, a resilient ground-wiping pad secured to and extending beyond the outer end of said bar, a first contact slidably mounted in a bore in said plate, spring means engaging said contact to oppose sliding movement in either direction, a resilient buffer stop on said plate below said first contact, positioned for contact by said bar upon flexure thereof, and a second contact fixedly secured in said bar, electrically insulated therefrom and arranged to engage said first contact on flexure of said bar.

3. A switch for use in a tire-deflation signaling circuit comprising a first plate adapted for attachment to the frame of a vehicle, a shelf extending perpendicularly from the face of said plate, a flexible second plate secured to the outer edge of said shelf, and extending beyond the end of said first plate, a first contact slidably mounted on one of said plates, a second contact fixedly secured in the other of said plates, electrically insulated therefrom and arranged to engage said first contact on flexure of said second plate, and a resilient buffer on the plate having the slidably mounted contact.

References Cited in the file of this patent

UNITED STATES PATENTS 2,666,106     Wilson _____ Jan. 12, 1954

FOREIGN PATENTS 6,009     France _____ Aug. 20, 1906
663,928     France _____ Aug. 27, 1929